Feb. 2, 1937.   W. L. MacKENZIE   2,069,256
NOZZLE FOR SHOE COATING MACHINES
Filed Feb. 20, 1936
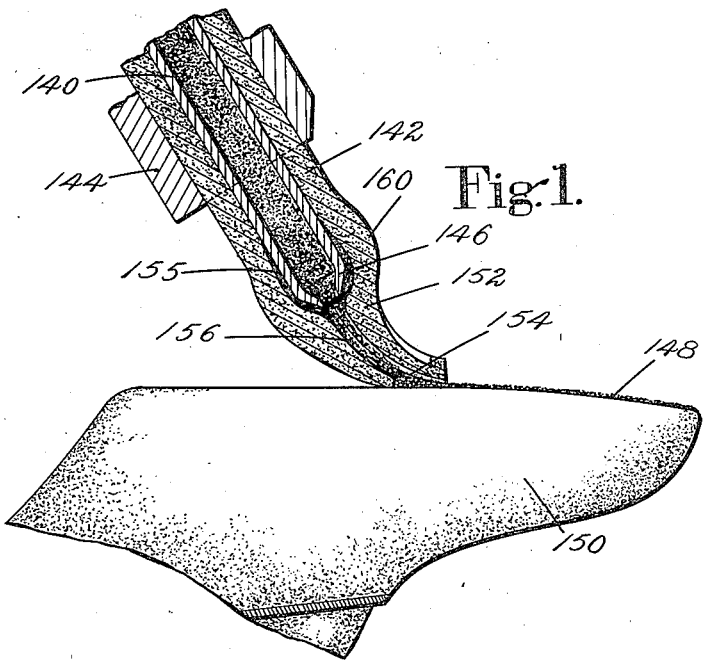
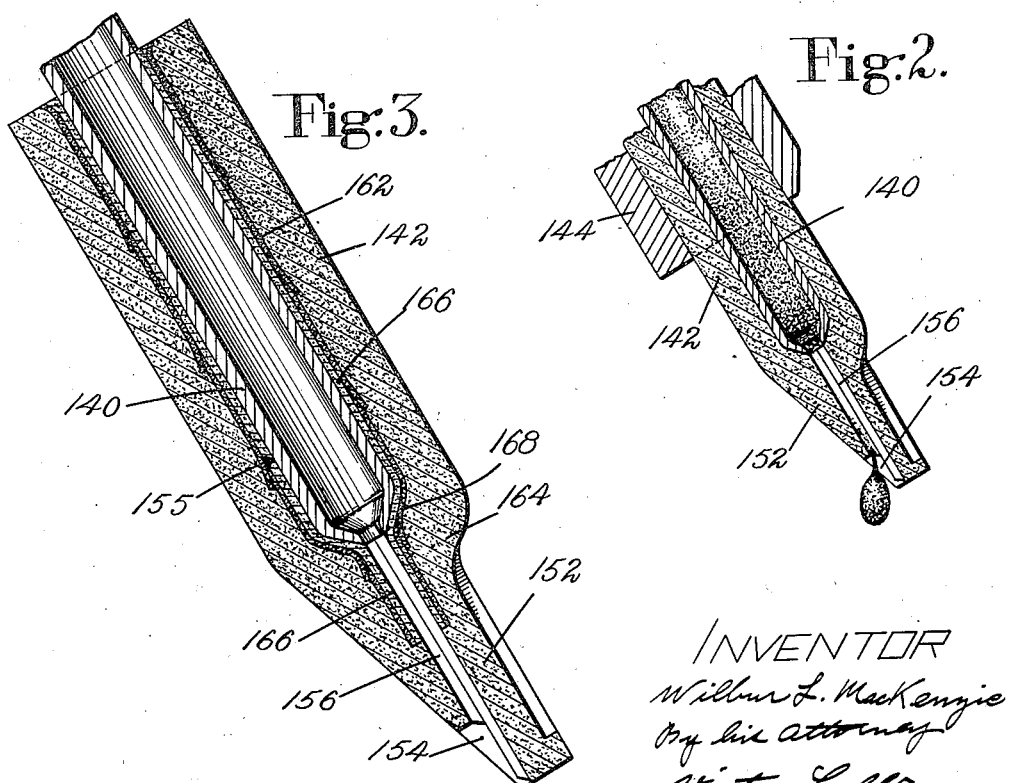
INVENTOR
Wilbur L. MacKenzie
By his attorney
Victor Cobb.

Patented Feb. 2, 1937

2,069,256

UNITED STATES PATENT OFFICE 2,069,256

NOZZLE FOR SHOE COATING MACHINES

Wilbur L. MacKenzie, Beverly, Mass., assignor to United Shoe Machinery Corporation, Paterson, N. J., a corporation of New Jersey Application February 20, 1936, Serial No. 64,965

5 Claims. (Cl. 91—43)

This invention relates to nozzles and is herein illustrated as embodied in a shoe-coating machine of the extruding type. One type of machine in which such nozzles are employed is used for applying a marginal band of cement to the bottoms of shoes to assist in securing soles thereto.

In that type of shoe in which the sole is secured to the upper by means of cement, it is the common practice to apply a marginal band of cement to the bottom of a lasted shoe. The application of a uniform band is, however, rendered difficult by the irregular and rough surface of the shoe bottom, comprising, as it does, many wrinkles and being curved in both the forepart and shank portions.

The operation has been successfully carried out mechanically by a machine disclosed in my prior application Serial No. 754,648, filed November 24, 1934, wherein there is employed a rubber nozzle having a flexible tip portion which yields under pressure of the work presented thereto so that good contact is maintained between the nozzle and the work, enabling the application of a band of uniform width and thickness.

Nozzles of this type are subject to deterioration due to the action of solvents in the cements to be applied and, after being used for a while, there is a tendency to drip which is not evident when the nozzle is first applied to the machine. The type of nozzle illustrated in my prior application and that shown herein is so constructed that when the pressure applied to the cement is relieved, as by closing the valve for the nozzle, there is normally no dripping, largely because of the fact that the passages between the body cavity of the nozzle and the outlet opening are of capillary size. However, in many cases dripping did occur which was found to be due to a swelling of the nozzle under pressure and a retraction of the swelled portion by the resiliency of the rubber after the pressure was relieved, thus applying just sufficient force to the residual cement to cause it to drip from the nozzle.

In view of these facts, it is an object of the invention to overcome this difficulty and to provide an improved nozzle from which there will be no dripping.

It was found, upon careful inspection, that the swelling of the nozzle is chiefly near the inner end of the body cavity where the passage of the nozzle is markedly constricted as it joins the capillary passages extending through the tip to the outlet opening. Apparently, this is due to the back pressure set up by reason of this constriction. Accordingly, the illustrated embodiment of my invention comprises a reinforcement surrounding the restricted portion of the nozzle. As shown, a fabric reinforcement is embedded in the nozzle structure at this point and does not extend far enough into the tip of the nozzle to interfere with its flexibility, which is so necessary in order to permit it to conform to the shoe bottom.

In the drawing,

Fig. 1 is a vertical section through a nozzle supported on a machine and showing, somewhat exaggerated, a swelling of the nozzle from the pressure of the cement;

Fig. 2 is a similar view after the pressure of the supply of cement has been shut off and the swelling reduced, and indicating the dripping which sometimes occurs at that time, and Fig. 3 is a vertical section, on a still larger scale, of my improved nozzle, reinforced to avoid the swelling and consequent contraction and dripping.

The nozzles illustrated in the drawing are intended for application to a machine of the extruding type in which the cement is supplied under pressure through a depending, inflexible, metallic tube 140, the hollow body 142 of the nozzle being slipped over the end of this tube and held in position thereon by a clamp 144. The lower end of the tube is slightly reduced at 146 to facilitate the application of the nozzle. One form of machine in which such a nozzle finds employment is utilized to apply a coating of cement to the bottoms 148 of shoes 150 which are moved to present successive portions of the shoes to the tip 152 of the nozzle. This tip is flexible so that it is deflected under pressure of the work, as shown in Fig. 1, and is provided with a recess 154 open on the lower side and at one end. This recess is connected to the cavity 155 of the hollow body 142 by means of a series of minute capillary passages 156 commencing at the inner end of the cavity and extending to the inner end of the recess. Nozzles of this type are commonly constructed of rubber or some equivalent therefor in order that the tip portion may be flexible to accommodate itself to the irregular and changing bottom surface 148 of the shoe. It has been found that, after continued use, there is a tendency toward a softening of the rubber of the nozzle as this is attacked by the solvents of the particular cement or other material being extruded. At any rate, there is a noticeable tendency for the nozzle to swell at 160 where the inner end of the cavity is constricted to the size of the beginning of the minute passages 156 and this is probably due to the back pressure set up by the reduced cross section of the passages 156 as compared with the cross sectional area of the cavity or of the supporting tube 140. This tends to break down the nozzle but even before that happens, it brings with it an undesirable dripping from the nozzle, as indicated in Fig. 2, as soon as the pressure in the supply tube 140 is relieved and the work removed from the machine. This relief of pressure is accomplished in the machine of my prior application, mentioned above, by means of a treadle (not shown) which shuts a valve (not shown) in the pipe leading to the tube 140.

With the improved construction shown in Fig. 3, the undesired swelling and consequent dripping previously encountered have been avoided by providing the nozzle with a fabric reinforcement 162 embedded in the material of the nozzle and extending from the tip 152 back along the body 142 of the nozzle. Preferably and in order to avoid deterioration of the nozzle material, a lining of some solvent resisting material, such as thiokol, has been employed, as indicated at 166. The strip of fabric reinforcement, preferably coated with rubber, is, in making up the nozzle, wrapped around the thiokol lining after the latter has been put in position in the form of a sheet over a core for a mold (not shown). Preferably, the reinforcement strip 162 is somewhat narrower at the end adjacent to the tip in order that it may be wound snugly around the core without wrinkling, as at the base 164 of the tip, and then is widened as it passes the enlarged inner end 168 of the hollow body and extends in a coil along the length of said body. With many cements, it is found that the thiokol lining 166 needs only to be extended along a part of the length of the passages and along the body cavity, as illustrated in Fig. 3. In other cases where the nozzle is to be employed with other types of cement, it is found preferable to provide thiokol on both the inner and outer surfaces of the nozzle and around the tip thereof, as shown and described in Letters Patent of the United States No. 2,056,325, granted October 6, 1936, for improvements in Nozzles for shoe coating machines, upon my application.

The improved construction shown in Fig. 3 effectively prevents any tendency toward swelling of the nozzle, such as has been shown in Fig. 1, and subsequent dripping therefrom (Fig. 2) by being substantially inextensible and thus able to resist the internal pressure and especially the back pressure set up at the inner end of the body cavity where the passages 156 begin. At the same time, the fabric is applied in such a way that the resilience of the tip of the nozzle is not impaired.

Having thus described my invention, what I claim as new and desire to secure by Letters Patent of the United States is:

1. A flexible nozzle adapted to be applied to a shoe-cementing machine on which there is a hollow tube through which cement is extruded, said nozzle comprising a hollow body adapted to be positioned on the end of the hollow tube and a tip provided with a minute passage between the cavity in the hollow body and the outlet of the nozzle, and means for restraining said nozzle against expansion, said restraining means being positioned adjacent to the constriction between the body cavity and the passage whereby back pressure, set up within the cavity, will not cause an expansion of the nozzle.

2. A passage-providing flexible nozzle comprising a hollow body by means of which the nozzle may be secured to cement-extruding means, the passage through said body being suddenly constricted as it extends from the hollow body to an outlet at the exterior surface of the nozzle, and means surrounding the nozzle adjacent to the beginning of the constricted passage and resisting expansion of the nozzle under internal pressure.

3. A flexible rubber nozzle comprising a hollow body having a cavity and a tip and having a minute passage extending from said cavity and emerging near the end of the tip, said rubber nozzle containing a reinforcement which surrounds the inner end of the cavity and a portion only of the minute passage.

4. A nozzle adapted to be applied to an inflexible support on a shoe-cementing machine, said nozzle comprising a hollow body of rubber having a cavity adapted to receive said inflexible supporting member and also comprising a resilient, tapered tip with which the work may be brought in contact, said tip being provided with minute passages beginning at the inner end of the cavity and emerging near the end of the tip, and a fabric reinforcement embedded in said rubber surrounding the inner end of the cavity where the minute passages begin.

5. A rubber nozzle one end of which is adapted to be applied to the end of an inflexible hollow support on a shoe-cementing machine, the other end of the nozzle comprising a resilient tapered tip with which the work may be brought in contact, said tip being provided with minute passages beginning at the inner end of the hollow body and emerging near the end of the tip, and a fabric reinforcement embedded in said rubber nozzle, said reinforcement being positioned around the inner end of the hollow body and reaching into the tip of the nozzle.

WILBUR L. MacKENZIE.